United States Patent [19]

Zimmer

[11] Patent Number: 5,347,620
[45] Date of Patent: Sep. 13, 1994

[54] SYSTEM AND METHOD FOR DIGITAL RENDERING OF IMAGES AND PRINTED ARTICULATION

[76] Inventor: Mark A. Zimmer, 2509 Huntington Dr., Aptos, Calif. 95003

[21] Appl. No.: 920,566
[22] PCT Filed: Sep. 5, 1991
[86] PCT No.: PCT/US91/06412
§ 371 Date: Aug. 14, 1992
§ 102(e) Date: Aug. 14, 1992
[51] Int. Cl.⁵ .......................................... G06F 15/62
[52] U.S. Cl. .................................. 395/129; 395/155; 345/179
[58] Field of Search ............... 395/129, 131, 130, 275, 395/155, 125, 135, 132; 340/739, 742; 345/179

[56] References Cited

U.S. PATENT DOCUMENTS

| | | | |
|---|---|---|---|
| 4,598,282 | 7/1986 | Pugsley | 340/703 |
| 4,789,854 | 12/1988 | Ishii | 340/703 |
| 4,819,018 | 4/1989 | Moyroud et al. | 354/5 |
| 4,855,937 | 8/1989 | Heartz | 395/121 |
| 4,951,132 | 8/1990 | Nakade et al. | 358/78 |
| 4,959,978 | 5/1990 | Kanamori et al. | 355/38 |
| 4,965,745 | 10/1990 | Economy et al. | 364/518 |
| 4,991,122 | 2/1991 | Sanders | 395/131 |
| 5,060,169 | 10/1991 | Khosla | 364/521 |
| 5,155,813 | 10/1992 | Donoghue et al. | 395/275 |
| 5,220,649 | 6/1993 | Forcier | 395/148 |
| 5,239,292 | 4/1993 | Willan | 340/709 |
| 5,289,566 | 2/1994 | Walker et al. | 395/132 |

Primary Examiner—Heather R. Herndon
Assistant Examiner—Mike Smith
Attorney, Agent, or Firm—Jeffrey A. Hall

[57] ABSTRACT

A system and method to accurately simulate digitally the rendering of a printed articulation, stroke, or mark of a donor natural medium used in graphic arts, such paints, pencils, erasers, or other implements. Using a computer (1) or other hardware the system and method of the invention allows a digital representation of dye-concentration color mixing, receptor grain and variable grain penetration, and a smooth and continuous brush stroke without visible artifacts. Other objects of the system and method of this invention include methods for varying the shape of the tip of an implement across the stroke for the purpose of accurately simulating brushes and other donor-receptor articulations common to natural media, and for rendering a brush stroke in multiple strokes to accurately simulate digitally brush bristles.

10 Claims, 4 Drawing Sheets

SYSTEM AND METHOD FOR DIGITAL RENDERING OF IMAGES AND PRINTED ARTICULATION

TECHNICAL FIELD

This invention relates to electronic image processing systems. Specifically, this invention relates to a system and apparatus to accurately simulate digitally the rendering of a printed articulation, stroke, or mark of a donor medium typically used in graphic arts, such as oil paints using a brush, pencils, colored pencils, felt pens, markers, crayons, charcoal erasers, and the like, and to accurately execute grainy or uneven characteristics, if desired, similar to those achieved on receptor media such as watercolor paper surfaces, cotton bond paper, cold and hot press papers, and canvas.

BACKGROUND ART

There are numerous standard computer peripherals available that allow "computer graphics" to be generated electronically. Typically these take the form of vector or raster displays with the input means provided by some form of touch tablet on which the user can draw and see the results of such work in real time on an electronic display.

The use of high resolution optical scanners to generate electronic, continuous tone raster image signals to depict continuous tone originals such as graphic art work and photographs is also well known. Usually the raster image signals are used in electronic plate making equipment to modulate a scanning laser beam, an electronic beam in a cathode ray tube, or the like, to fashion a facsimile of the continuous tone original on an appropriate printing master. The content of the original must be in a final form before the scanner generates the raster signals because limitations in the means to for making changes to the electrical image like touch up work, corrections, or modifications of artwork by an artist.

Normally, an artist changes shading, changes tone levels, corrects or modifies color hue, and erases or smears small defects. An artist also varies the shape of the tip of the implement used to render various artist effects, as well as filling in details, erases regions, and otherwise changes and modifies the artistic work. Such image retouching, when done electronically, is provided by devices which can be manipulated as if it were a brush or other implement by an operator viewing a cathode ray tube or other type display, to make corrections, modifications, or erasures to an electrical raster image during real time interaction between the user and the displayed image.

Such memory devices store the electrical signals representative of an image sought to be corrected or modified. The electrical image is made visible to an observer by providing the electrical signals to a display device. A brush tip image, for example, is created on the display over the visual image. The electrical brush usually includes a pointer device that is manipulated by the user to alter or touch up the continuous tone image. The pointer modifies the tone of the displayed image when it is moved in a brush like fashion and a button the pointer is depressed. Such movement of the pointer causes a like movement of the brush tip image. The motion and button depression allow the user to obtain image changes under the brush tip image with a stroking action which, with significant limitations, approaches that of an artist working on a painting.

In one well known embodiment, the pointer is activated by what is conventionally known as a mouse. The apparatus includes a ball bearing which is rolled over a surface to generate positive signals that move the image of the brush over the visual image on the display. The pointer may also include a plurality of buttons which are used to touch up images by simultaneously rolling the pointer over the surface and depressing one on the buttons to increase tone level of the signals in the memory corresponding to the signals in the region of the brush; to decrease the tone level image signals in the region of the brush; or to vary the size of the image of the brush tip when it depressed along with one of the other buttons. Numerous variations are available, such as hand held pointers, and varying the size or type of implement. Cursor and pointer devices are also well known in the prior art as well as systems and methods to modify rather than replace existing image data.

A fairly common application of digital techniques comprises an electronic graphics system with a touch tablet having a stylus, a computer, and a framestore with associated color generation capacity for the display. The user draws with the stylus of the touch tablet and the computer registers the coordinates (x,y) of the stylus while recalling the selected color with which the user has chosen to draw. The computer then provides the appropriate addresses to the framestore where the pixel at that address is modified to hold a pre-selected code corresponding the chosen color which it receives as incoming data. When the framestore is read at normal broadcast video rates then the lines, or illustrations drawn by the user are visible on the display.

It is also well known to generate color for display from RAM stores providing the blue, green or red components respectively to generate a desired color combination, where equal amounts of the red, green or blue (RGB) components will produce a monochrome image of a particular density. If data from the frame store is 8 bits wide, this allows for 256 different color combinations. The capacity for the RAMs is chosen accordingly. Various color parameters are directed into the RAMs from the computer and can be updated and varied as desired. Usually the RAMs are selected to operate as ROMs in dependence on the framestore generating output.

This type of system where the path from the touch tablet to the framestore and the display via the computer is all unidirectional, since the computer only writes from the framestore and does not read from it, and consequently makes no use of the information contained in the framestore. The quality of the product produced by such a system is significantly limited and is partially a result of the only 256 possible combinations in each pixel and therefore only 256 saturations, hues or luminance representations are possible on the screen for any given picture. To achieve a level of representation approaching "fine art" far more color combinations would be necessary.

Numerous prior art attempts to simulate drafting tools and to improve on the quality of the graphic product exist. Representative of this genre is U.S. Pat. No. 4,633,416 issued to Walker where color is replaced as the system draws rather than overlaying dyes using interpolation techniques. To achieve smearing effects a recursive low-pass filter is utilized. Significant limitations of such system include the inability of such system to render each bristle of a brush stroke independently; no are means provided to properly space dabs of paint to create an effective brush stroke; real time parameters such as velocity and stroke direction as controllers for the brush stroke are not provided, nor are provisions made varying the width or the shape of the brush stroke.

Various other patents describe attempts to simulate the rendering of printed articulation. Representative of this genre include U.S. Pat. No. 4,524,421 issued to Searby et al., an U.S. Pat. No. 4,514,818 issued to Walker, U.S. Pat. No. 4,751,503 issued to Kermisch, U.S. Pat. Nos. 4,775,858 and 4,931,956 issued to Stapleton, U.S. Pat. No. 4,318,096 issued to Thornburg et al., and U.S. Pat. No. 3,486,826 issued to Mueller. None of the prior art, however, provides a method or system for accurately rendering an accurate electronic analogy of artists tools such as paint brushes, charcoal, chalk, pencils, or other implement. Nor are any systems or methods described in which critical factors in producing a very high quality product are disclosed such as dye-concentration color mixing; effective variable grain penetration; provisions allowing for receptor grain penetration to affect the strokes in real time during the stroke; means for varying the shape of the tip of the brush across the stroke in order to accurately simulate a brush stroke; or means for rendering a brush stroke in multiple strokes for the purpose of simulating brush bristles.

DISCLOSURE OF INVENTION

In accordance with the present invention a method and apparatus are provided to simulate digitally the rendering of a printed articulation to closely approximate by electronic analogy an artists tool in order that the user may manipulate a stylus so that results which appear on the display make it appear that he is working with a brush, pencil, felt pen, chalk, charcoal, crayon, eraser, or other implement.

The improved method and apparatus possess the advantage of providing extremely smooth brush strokes by anti-aliasing the brush strokes and storing multiple copies of each brush of a given size, and then rasterizing each copy with a different subpixel origin in x and y, thereby resulting in no discernable artifacts from rasterization. This improved method is accomplished in a two-dimensional image field, this field being a plurality of pixels, and being organized into a two-dimensional array, the dimensions being labelled x and y in accordance with mathematical convention. A pixel (picture element) is typically represented by red, green, and blue (RGB) component values. To accomplish anti-aliasing, positions are required in subpixel accuracy, such accuracy being to a resolution of significantly less than one pixel in both x and y. Extremely accurate color representations are provided by dye-concentration and color mixing in which brush strokes are colored by adding, mixing, thinning, thickening and removing dyes rather than interpolating additive RGB or luminance-chrominance (YIQ) color. Variable grain penetration is provided to accurately approximate the effect of a brush or other implement interacting with the grain of the receptor medium. To achieve such representation the method applies a grain channel, which is taken from a rectangular 8-bit fill pattern. The grain results from the fill pattern which is provided by an unsigned map of values which represent the three-dimensional surface of the grain.

There is also provided a new method and apparatus for varying the shape of the tip of the brush or other implement across the length of the stroke, and for rendering accurate representation of such brush or other implement and other related donor-receptor articulations common to natural media. To achieve such representations multiple brush or other implement sizes are used to aid in construction a tapered stroke, and by varying continuously the size of such stroke along the slope as a function of pressure, velocity, direction, or some combination of such parameters, and presenting such articulation on the display. Moreover, multiple strokes are achievable with the present invention to accurately represent artist tools such as a camel's hair brush and relating such strokes to one another in direction, pressure, and velocity.

Accordingly, to achieve these and other advantages, a method and apparatus are provided for achieving continuous, smooth brush strokes by the ascertainment of a set of implement tip positions, said stroke being provided by a tablet, pen, stylus, mouse, or other locator device under manual control, said positions being aligned along the stroke with a regular spacing which is related to the current width of the brush stroke, said ascertainment being accomplished by the alignment of two-dimensional implement tip height field templates with said positions, said two-dimensional implement tip height field templates being rendered with sub-pixel accuracy for accurate positioning, the set of said height field templates for a given width implement tip being comprised of a plurality of two-dimensional implement tip height fields. Furthermore, the method specifies that the number of two-dimensional implement tip height fields that are stored for a given width implement tip be strongly dependent upon that width; a smaller number of two-dimensional implement tip height fields are stored for a large implement tip width than are stored for a small implement tip, which improves the user's perception of a smooth stroke with small widths and also reduces the storage requirements for large implement tips.

Furthermore, a system and method for sequencing and accurately placing multiple marks of contact or strokes made by an implement tip onto a surface, taken from a single such stroke, and for producing strokes or marks of contact similar to and accurately representing brushwork is provided. Typical brushwork in the natural medium includes brush strokes made by a camel's hair brush or other brushes with individual bristles; specific brushwork found in impressionist fine art exhibits multiple strokes wherein each stroke is collimated with others in the same area. The strokes are produced in a two-dimensional image field on a computer or other hardware. The method preferably comprises: collecting all input samples for a stroke of an implement tip in relation to a surface into a store, the samples comprising location in x and y, pressure, bearing angle, tilt, and roll of said implement tip, then creating a family of strokes related to the original stroke, the number of strokes being typically in the range 2 through 20, but may be otherwise, and displacing each of the strokes by its own vector, this vector being formed by a polar coordinate with random bearing and random length. It is also possible to scale the vector as a function of the stroke width at each location in the stroke, this scaling function is preferably a fraction of the current stroke width at each location.

A system and method are also provided by the present invention for simulating the variable penetration of an implement into a surface grain by the ascertainment of a two-dimensional field of donor medium fractions, said ascertainment being accomplished one element at a time, for producing contact marks of said implement resulting in natural-looking strokes as modulated by any given real-time-parameter or parameters under manual control such as the pressure, direction, velocity, bearing angle, tilt or roll of a locator device. The data is produced in a two-dimensional image field of a computer or other hardware, said method comprising the steps of: processing a surface grain height field value that maps onto a pixel from the two dimensional image field, said value representing a normalized, instantaneous height of said surface grain corresponding to the deviation from uniform flatness of said surface; evaluating an implement height field that corresponds to an element from said two-dimensional image field, said value representing a normalized, instantaneous height of said implement, such that the two-dimensional height field comprising a plurality of heights of said implement corresponds to the three-dimensional shape of the tip of said implement; sequencing said implement height field value by the product of said real-time varying parameter or parameters and a sequencing fraction, said parameters being responsive to manual control and corresponding to variations in pressure and/or velocity of the tip of said implement in relation to said surface, the sequencing fraction corresponding to the quotient in sequences of said implement tip and said surface grain field height field, and usually but not necessarily taking on values between 8 and 32; subtracting said surface grain height field value from said implement height field value to produce a penetration fraction, said penetration fraction correspond to opposing height fields and modelling the contact of the tip with the surface; comparing said penetration fraction with zero and precluding effects on said two-dimensional image field if said penetration fraction is less than or equal to zero and a limitation corresponding to a limitation of the amount of the donor medium deposited by the tip of said implement when in contact with said surface; scaling said penetration fraction by said real-time-varying parameter or parameters, said parameters being responsive to manual control and corresponding to variations in the overall amount of said donor medium concentration or thickness due to the velocity and and/or pressure of the tip of said implement in relation to said surface; and, then applying said penetration fraction to control the deposit or removal of color from said two-dimensional image field.

The system and method of the present invention also provide means for overlaying a donor color onto a receptor color. The donor color and receptor colors are represented in red-green-blue component format. For producing marks, dyes washes, stroke coloration, or other effects similar to those produced with natural dyes, data is produced in a two-dimensional image field on a computer, the image field comprises picture element which can individually be used for said receptor colors. The system and method comprises the steps of: modifying said red, green, and blue (RGB) receptor picture element components into cyan, magenta, and yellow density components comprising a three-element absorption spectrum, said absorption spectrum being represented in the log-density domain; converting said RGB donor picture element components into cyan, magenta, and yellow density components comprising a three-element absorptions spectrum, said absorption spectrum is represented in the log-density domain; scaling the color components by said penetration fraction; transforming said color density components to the RGB updated receptor transmittances; and then depositing said RGB transmittances into said two dimensional image field, said deposit operation resulting in a change to said two-dimensional field color as represented by the RGB component values.

In still further accordance with the present invention a system and method are provided for computing surface grain, said surface grain being a two-dimensional height field mapped onto an image with a one-to-one mapping, said computation being performed selectively for production of a grainy or textured image analogous to an implement on a grainy surface, wherein the data is produced in a two-dimensional image field on a computer, said system and method comprises: storing the surface grain into a two-dimensional rectangular height field store, said store comprising a rectangular patch designed to repeat both horizontal and vertical comparison with other copies of said rectangular patch so that an infinite two-dimensional plane may be regularly tessellated by copies of said rectangular patch without visible flaws in the texture; evaluating the mapping for the surface grain onto each picture element location in said image by computing the horizontal patch image and vertical patch image, and then retrieving the corresponding height field value from said rectangular surface grain height field store by using the horizontal and vertical patch indices as addresses in the rectangular surface grain height field store and using the addresses to locate the corresponding height value.

To vary the tip size of a selected implement which comes in contact with a surface in response to a real-time-varying parameter or parameters the present invention provides a system and method in which said parameter or parameters are under manual control, and produces strokes or marks of said implement which exhibit varying widths, said data is produced in a two-dimensional image field of a computer or other hardware and in which the system and method comprises: computing a set of implement tip height field arrays which vary in width from the minimum desired implement tip width to the maximum desired implement tip width, each height field array representing a single implement tip width, and being represented as an array of two dimensional height fields, each two-dimensional height field being a separate rendering of the implement tip height field of a given width and with an individual horizontal and vertical subpixel offset; varying the desired width of said implement tip in response to a real-time-varying parameter such as velocity, direction, pressure, bearing angle, tilt angle, roll angle or the like, of a locator device, in which said parameters correspond to the motion of said implement tip; selecting said implement tip height field array whose width most nearly approximates the desired implement tip width; applying the chosen implement tip height field array; and then modifying the spacing of contact marks so that the contact marks are spaced by a distance proportional to the average width of said contact marks.

BRIEF DESCRIPTION OF DRAWINGS

The details of the invention will be described in connection with the accompanying drawings, in which.

BEST MODE FOR CARRYING OUT THE INVENTION

Now, explanation will be made of embodiments of the present invention, with reference to the drawings.

Figure 1:
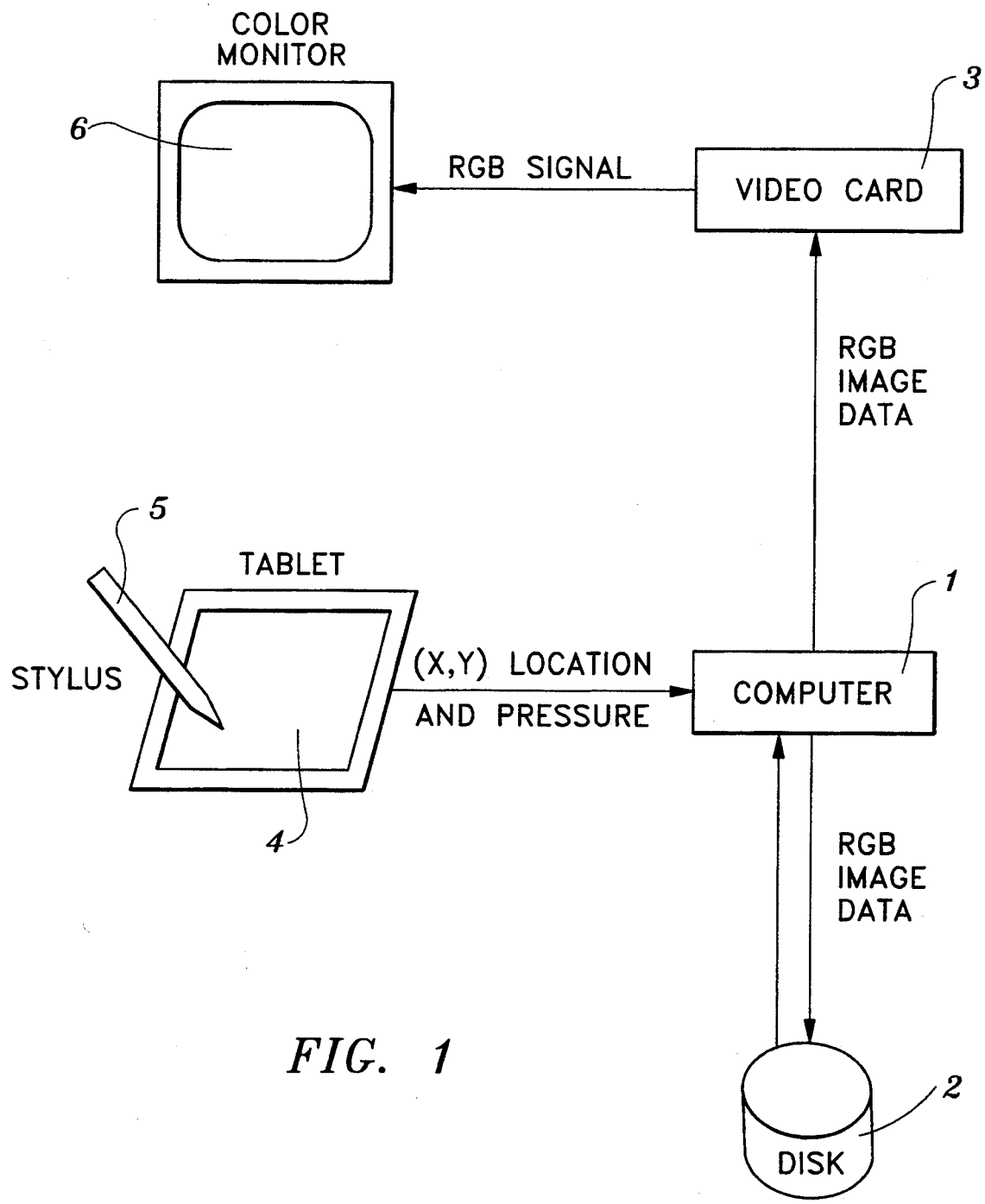
FIG. 1 shows the operation of the system from the manual control of the tablet device to the display of the image data on the screen to the storage of the image data on disk, in coded form, according to the invention.

FIG. 1 is a block diagram showing an embodiment of a system and apparatus to accurately simulate digitally the rendering of a printed articulation according to the present invention under manual control. In FIG. 1, a computer 1 receives data from a locator device such as tablet 4 in combination with stylus 5. The stylus and tablet may be substituted by other conventional locator apparatus such as a mouse, trackball, or touch pad. Image data is stored and retrieved from disk 2 and operated on by the computer 1. Image data is preferrably transmitted to video card 3 and an RGB signal of the image data is displayed on color monitor 6.

The present invention uses a computer or other hardware to accurately simulate digitally the rendering of a printed articulation, stroke, or mark of a "donor" natural medium typically used in graphic arts, including oil paints using a brush, pencils, colored pencils, felt pens, markers, crayons, chalk, charcoal, erasers, bleach, and other tools onto a surface exhibiting grainy or uneven characteristics such as those "receptors" also typically used in natural graphic arts media, including cotton bond paper, watercolor paper surfaces, cold and hot press papers, and canvas.

The system and method of the present invention utilizes computer algorithms in combination with a computer or other hardware to simulate digitally printed articulation. To create accurate representations of brush strokes electronically the present invention anti-aliases its brush strokes, making them smooth and with virtually no discernable artifacts from rasterization. To accomplish this, several copies of each brush of a given size are inputted, and each copy is rasterized with a different sub-pixel origin in x and y.

Prior art systems have utilized related techniques, however, they used 8 by 8 copies (at varying sub-pixel offset in x and y) for each brush regardless of size. Such technique was inefficient for large brushes and of poor quality for very small brush representations. In contrast, the present invention retains a larger number of copies for small brushes and a smaller number of copies for larger brushes.

In the preferred embodiment of the invention n by n copies of the brush are retained and then rendered at sub-pixel resolutions, where n is defined in terms of the brush radius by the formula:

$$n = \min(16, \max(1, \text{pow}(2, \text{ceiling}(3 - \log 3(\text{radius}))))).$$

The min(a, b) function returns the minimum of the two values a and b. The max(a, b) function returns the maximum of the two values a and b. The pow(a, b) function returns the value of a taken to the nth power. The ceiling(a) function returns the least integer greater than or equal to the value of a. The log 3(a) function returns the logarithm to the base 3 of the value of a. The radius value is the radius of the brush, which determines the brush size.

For example, assume n takes on values of 1, 2, 4, 8, and 16 based on the brush radius. For brushes with radius greater than or equal to 27, only one copy is used per brush size. For brushes with radius greater than or equal to 9 and less than 27, 2 copies in each direction are preferably employed for a total of 4 copies per brush size. For brushes with radius greater than or equal to 3 and less than 9, 4 copies in each direction are used for a total of 16 copies per brush size. For brushes with radius greater than or equal to 1 and less than 3, 8 copies in each direction are used for a total of 64 copies per brush size. For brushes with radius less than 1, 16 copies in each direction are used for a total of 256 copies per brush size.

In another case where it is desired to create a brush with radius of 13 pixels, for example, a set of 16 brush copies are preferably created in a 4 by 4 array. Each brush copy has its own individual sub pixel offsets in x and y, as follows (shown in the format (x offset, y offset)):

| (0.00, 0.00) | (0.25, 0.00) | (0.50, 0.00) | (0.75, 0.00) |
| --- | --- | --- | --- |
| (0.00, 0.25) | (0.25, 0.25) | (0.50, 0.25) | (0.75, 0.25) |
| (0.00, 0.50) | (0.25, 0.50) | (0.50, 0.50) | (0.75, 0.50) |
| (0.00, 0.75) | (0.25, 0.75) | (0.50, 0.75) | (0.75, 0.75) |

To accurately render brush strokes and maintain an even consistency, opacity, and grain penetration of the brush stroke, the overlaying and positioning of the dabs within a stroke is programmed using a new method which is detailed here.

Figure 2:
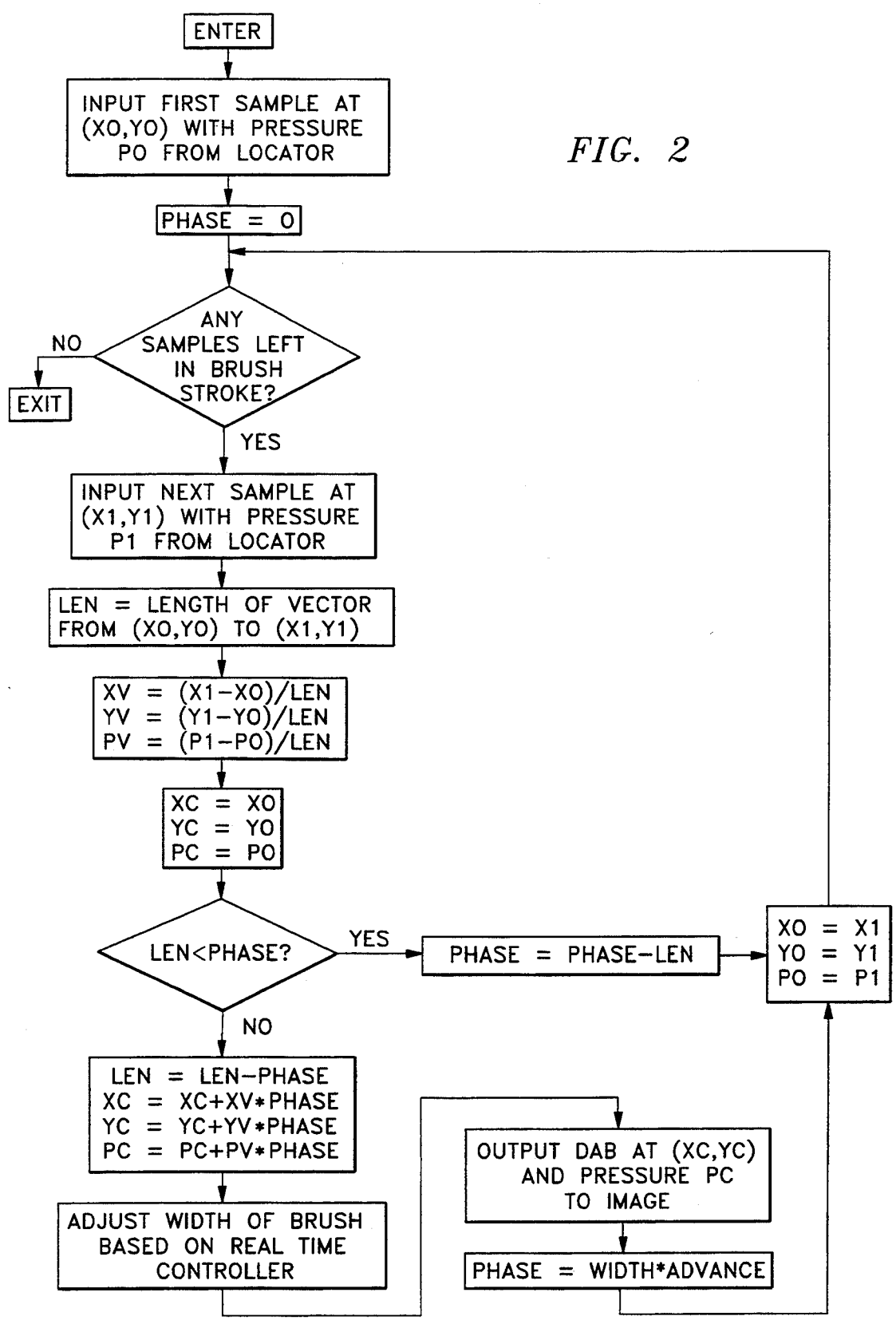
FIG. 2 is a flow chart which illustrates the method for providing a brush stroke for visual representation of the image on a display screen, according to the invention.

Referring to FIG. 2, when brush dabs are placed along a stroke, they are spaced at a distance which is a percentage of the current brush width. This is true even when the brush width changes during a stroke. When brushes are not circular, it is important to alter the spacing so that a consistent stroke is produced for all stroke directions.

Typically, a stroke is sampled in time using a stylus or other locator which corresponds, in the user's hand, to a donor medium. A sample may consist of an image location in X and Y (preferably with greater accuracy than integer pixels), a pressure value P (which ranges from 0.0 to 1.0 inclusive), and optionally a tilt value (ranging between 0.0 and pi/2 radians inclusively), a bearing angle (ranging between 0.0 and 2*pi radians), and a roll angle (also ranging between 0.0 and 2*pi radians). The samples are preferably spaced at even time increments. Straight lines may then be drawn between the samples such that a continuous path is formed from the start to the end of the stroke. It should also be noted that interpolation is also done between the pressure, tilt, bearing, and roll samples as well, forming a continuous signal for these parameters along the stroke, as shown in FIG. 2.

As flowcharted in FIG. 2, dabs of the brush are placed along this path, according to their individual pressure, tilt, bearing angle, and roll values. These ancillary values are used for the computation of grain penetration amount, opacity, brush size, dye concentration, and other values which can change along the stroke path.

Figure 3:
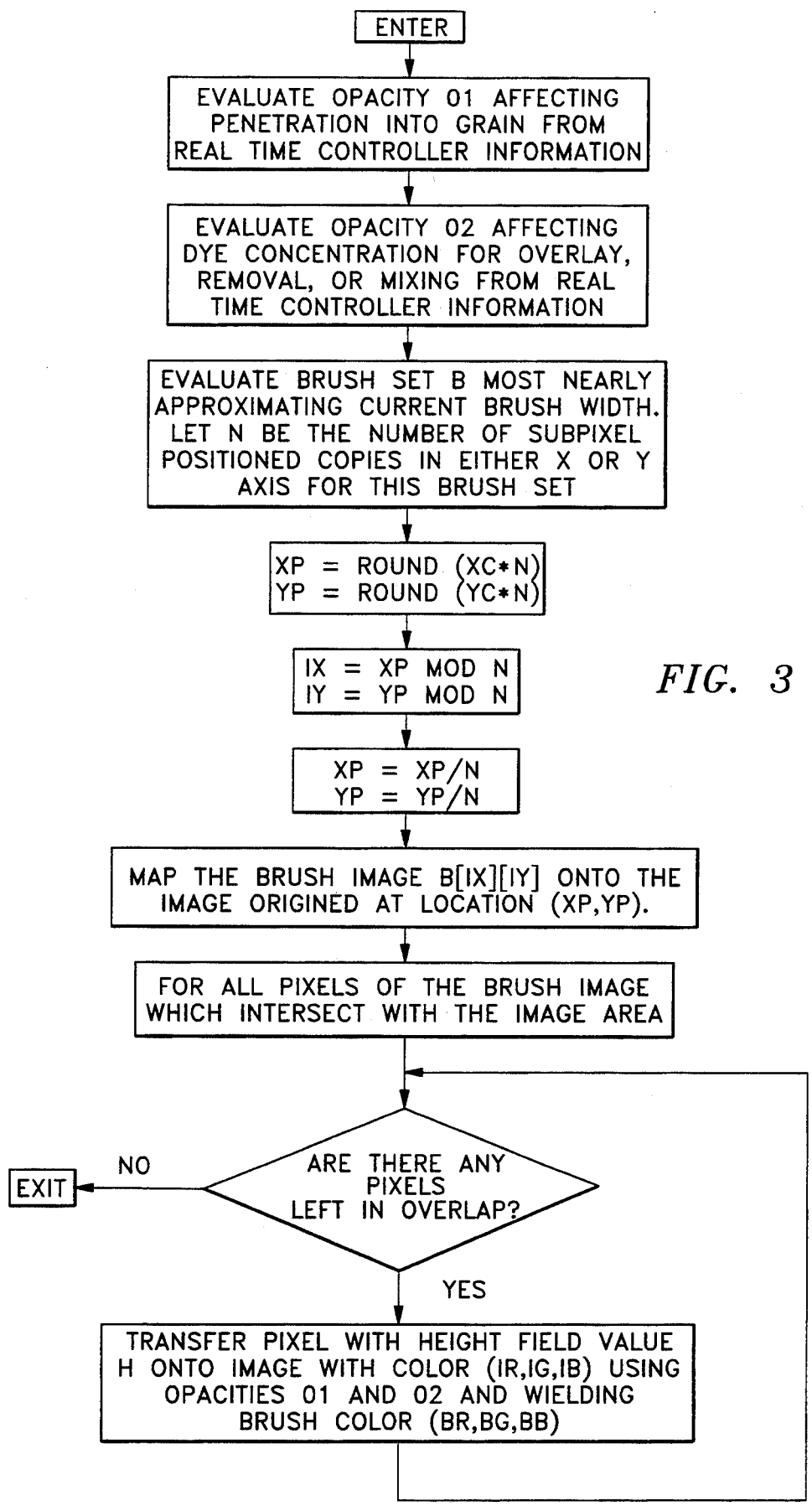
FIG. 3 is a flow chart which illustrates the method for providing a dab within a brush stroke for visual representation of the image on a display screen, according to the invention.

Referring to FIG. 3, a flowchart is illustrated for the process of positioning a single dab of the brush stroke. Initially, opacities are evaluated which correspond to the penetration into the grain of the dab and the concentration of the dyes used in rendering the dab. These values are generally a function of realtime varying parameters such as pressure, velocity, bearing angle, tilt angle, and roll angle of the implement tip. For the current width of the brush stroke, a brush set is evaluated which most closely approximates this width. A dab is then placed at subpixel accuracy using rounding and truncation operations as detailed in FIG. 3.

Next, explanation will be made of an embodiment of a dye-concentration color mixing system, according to the present invention. Preferably, colors are mixed in brush strokes by adding, mixing, thinning, thickening, and removing dyes rather than interpolating additive RGB (red-green-blue) or YIQ (luminance-chrominance) color.

Preferably, normal color images are stored in the RGB color format. This is the primary reason that prior art systems utilized mixing in RGB color space. First, mixing in RGB space was easier, and secondly, little conversion was required when fetching values from or writing results into a frame buffer. The present invention, in contrast to such prior art, utilizes a color mix and overlay strategy based upon the physics of color absorption (subtractive color).

For reference, the prior art interpolates color by interpolating the separate components of the RGB color. For instance, if color 1 (as represented by the RGB components R1, G1, and B1) is "mixed" with color 2 (as represented by the RGB components R2, G2, and B2) using color 1 weight W1 and color 2 weight W2. The present invention, by contrast, produces the resultant color (as designated by the RGB components R, G, and B) in the following way:

$R = R1*W1 + R2*W2,$ $G = G1*W1 + G2*W2,$ $B = B1*W1 + B2*W2.$

With color mixing, it is generally assumed that the sum of W1 and W2 is 1.0.

Further, the present invention also represents color as RGB components. A critical distinction being that the color mixing functions are accomplished in a different color space. Therefore, color operations are calculated in dye-concentration space, a space which is much more natural for color mixing than RGB space. In the dye-concentration space, color is preferably represented by (1) the concentration of the cyan dye, (2) the concentration of the magenta dye, and (3) the concentration of the yellow dye. It is readily apparent, that such method and system differs in a non-trivial way from RGB color space for the purposes of color mixing.

In a case of laying down a wash of a dye onto a sheet of plain white paper, the density curves of the paper (which are usually very low values, since the paper appears to be white) are added to the density curves of the dye to produce the density curves of the dyed paper. In colorimetry, density curves are usually represented as a vector of density values for discrete bands within the electromagnetic spectrum. These bands are normally set between 400 nm (nanometers) and 700 nm, corresponding to the visible light spectrum. For industrial dye work, 30 bands are usually used, at 10 nm increments. The density values are measured as the optical densities for each band. In other words, density (as used here) is the negative of the logarithm of the transmittance. This matches the common definition of optical density (as used by printers and other industries) and extends it for colorimetric purposes.

The present invention performs functions on colors by operating on their density vectors. For speed and efficiency, preferably only three bands are used, centered on the wavelengths of the primary colors of RGB space (red, green, and blue). The red transmittance component of the RGB signal (called "Tr") is converted to cyan dye density component (called "Dc") on the band between 580 nm and 700 nm. The green transmittance component of the RGB signal (called "Tg") is converted to magenta dye density component (called "Dm") on the band between 490 nm and 580 nm. The blue transmittance component of the RGB signal (called "Tb") is converted to yellow dye density component (called "Dy") on the band 400 nm to 490 nm. These dyes represent "perfect" dyes, and thus representations of the provided natural media is slightly more colorful than the actual natural media. These conversions are performed as follows:

$Dc = -\log(Tr),$ $Dm = -\log(Tg),$ $Dy = -\log(Tb).$

In the above formulas, the log(a) function returns the logarithm to the base 10 of the value of a. In the remainder of this disclosure the above three formula lines will be abbreviated by the single line:

transmittance_to_density(Tr, Tg, Tb, Dc, Dm, Dy).

Note that, in this procedural abbreviation, the parameters Dc, Dm, and Dy are passed in the manner of PASCAL "var" parameters (or by address in the language C).

When such conversions are performed, the transmittance component values preferably equal 0.0. In the above calculations, the density of the pure dye is taken to be infinite. In practice, the a value of 3 is substituted for the density. This is because the image's RGB components are stored as 8 bits per component, limiting the transmittance components between integer values 0 and 255, inclusively. Note that these 256 values correspond to transmittances of 0, 1/255, 2/255, ..., 253/255, 254/255, and 1 respectively. The densities of these 256 discrete component values are then computed to be (approximately) ∞, 2.41, 2.11, ..., 0.00346, 0.00173, and 0.0. Replacing the density value of the zero transmittance value (which is infinity) with a value of 3.0, monotonicity will be preserved in the set of discrete densities representable in 8 bits.

To convert back from the three-element density vector to the three-element transmittance components, the following inverse formula is employed:

$Tr = \text{Pow}(10, -Dc),$ $Tg = \text{Pow}(10, -Dm),$ $$Tb = \text{Pow}(10, -Dy).$$

In the above formulas, the pow(a,b) function returns the value of a raised to the power of the value of b. In the remainder of this disclosure the above three formula lines will be abbreviated by the single line:

density_to_transmittance(Dc, Dm, Dy, Tr, Tg, Tb).

Note that, in this procedural abbreviation, the parameters Tr, Tg, and Tb are passed in the manner of PASCAL "var" parameters (or by address in the language C).

Figure 4:
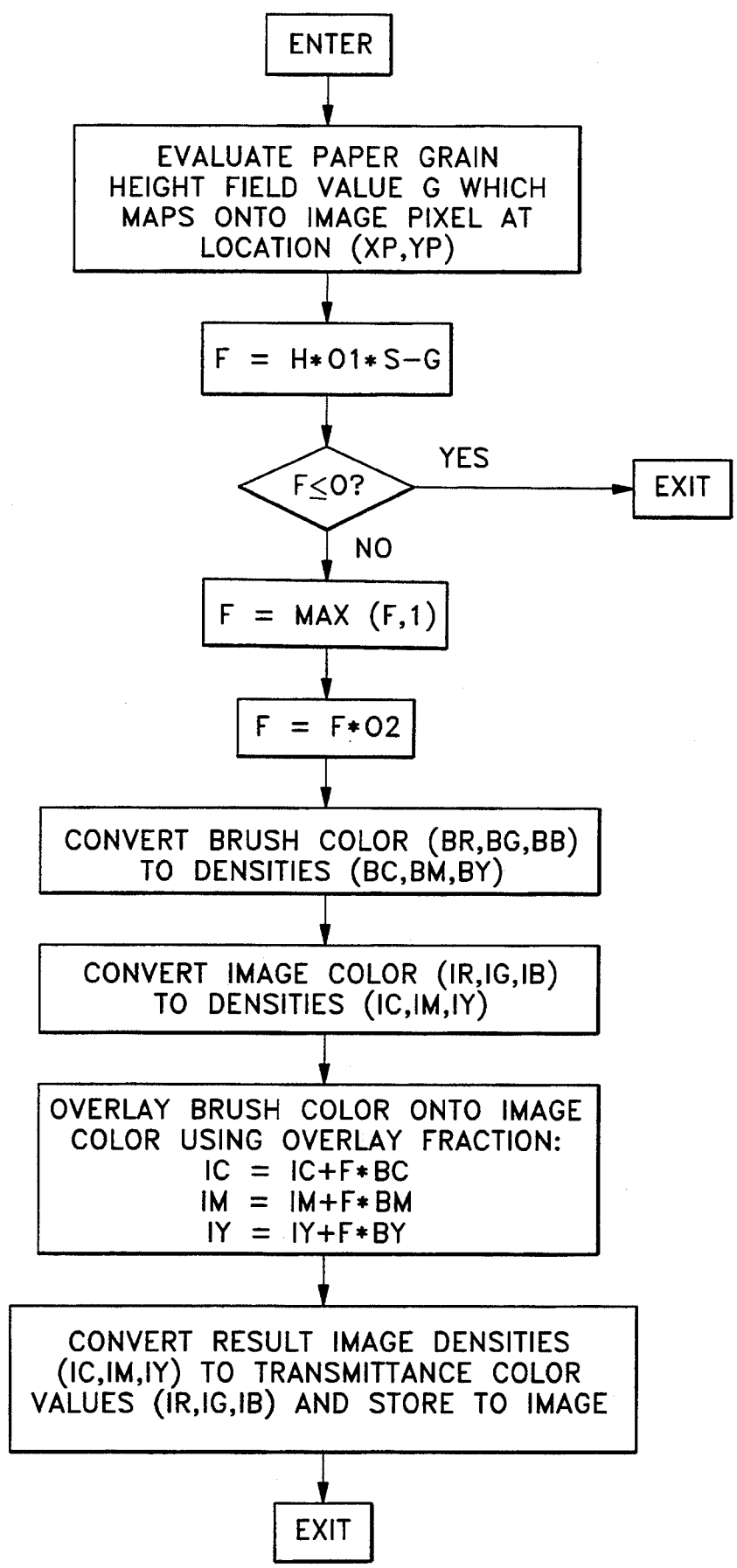
FIG. 4 is a flow chart which illustrates the transfer of a pixel of a dab to the image, according to the invention.

In an image, the present invention overlays dyes by adding their density vectors. This approach is far superior to additive color interpolation of the prior art because it preserves the saturation of the color. This is best seen in FIG. 4.

Images are represented in RGB for purposes of efficiency of display. Brush colors are also stored in RGB for simplicity. When duplicating any medium which deposits partially transparent dyes or pigments to the page, the optical density of the page increases. This is particularly true of colored pencils, felt pens, crayons, and water colors. The present invention simulates these processes by overlaying brush color onto the image color. For example, the RGB components are assumed to be on the range 0.0 to 1.0 inclusive. An additional fraction "Of" allows control over the amount of bush color overlayed. This fraction can take on any value from 0.0 to at least 8.0, thickening the dye concentration of color in the brush far beyond the usual 100 percent. The formula for accomplishing this overlay is as follows.

(1) The image color components (Ir, Ig, and Ib) are converted to image densities (Ic, Im, and Iy):

transmittance_to_density(Ir, Ig, Ib, Ic, Im, Iy).

(2) The brush color components (Br, Bg, and Bb) are converted to brush densities (Bc, Bm, and By):

transmittance_to_density(Br, Bg, Bb, Bc, Bm, By).

(3) The brush densities (Bc, Bm, and By) are reconcentrated by the overlay fraction (Of) and added back into the image densities (Ic, Im, and Iy) to make the new image densities (Ic', Im', and Iy'):

$$Ic' = Ic + Of^*Bc,$$

$$Im' = Im + Of^*Bm,$$

$$Iy' = Iy + Of^*By.$$

(4) The new image densities (Ic', Im', and Iy') are converted back into the new image color components (Ir', Ig', and Ib') for the purpose of storing back into the image conveniently:

density_to_transmittance(Ic', Im', Iy', Ir', Ig', Ib').

In the above example, the pow(a, b) function returns the value of a raised to the bth power. The log(a) function returns the logarithm to the base 10 of the value of a.

In a case where erasure or removal of dyes is desired, such function is accomplished by removing percentages of density evenly from the three density components. This creates an eraser function which does not alter saturation as it erases (unlike RGB eraser implementations which interpolate to white and thus generate implicitly less saturated colors towards white).

The present method of removing density can be controlled by a fraction (called "Ef") that is related to the pressure exerted when using a natural eraser. In the following method, the image and brush components are designated using the same names as above. The method of removing dyes is given as follows:

(1) The image color components (Ir, Ig, and Ib) are converted to image densities (Ic, Im, and Iy):

transmittance_to_density(Ir, Ig, Ib, Ic, Im, Iy).

(2) A fixed amount of density is subtracted from each image density.

$$Ic' = Ic - Ef,$$

$$Im' = Im - Ef,$$

$$Iy' = Iy - Ef.$$

(3) The new image densities (Ic', Im', and Iy') are converted back into the new image color components (Ir', Ig', and Ib') for the purpose of storing back into the image conveniently:

density_to_transmittance(Ic', Im', Iy', Ir', Ig', Ib').

In the above example, the pow(a, b) function returns the value of a raised to the bth power. The log (a) function returns the logarithm to the base 10 of the value of a.

The method and apparatus of this invention simulates the effects of water on a dye-based image by allowing mixing of colors in the density domain. The mixing of colors in the density domain is accomplished using the weighted average of the colors' densities. This generalizes to many colors, in the following example, two colors are considered.

(1) The color components (Ir1, Ig1, Ib1, Ir2, Ig2, and Ib2) are converted to densities (Ic1, Im1, Iy1, Ic2, Im2, and Iy2):

transmittance_to_density(Ir1, Ig1, Ib1, Ic1, Im1, Iy1), transmittance_to_density(Ir2, Ig2, Ib2, Ic2, Im2, Iy2).

(2) The densities are summed using their weights W1 and W2:

$$Ic' = W1^*Ic1 + W2^*Ic2,$$

$$Im' = W1^*Im1 + W2^*Im2,$$

$$Iy' = W1^*Iy1 + W2^*Iy2.$$

(3) The new densities (Ic', Im', and Iy') are converted back into the new color components (Ir', Ig', and Ib'):

density_to_transmittance(Ic', Im', Iy', Ir', Ig', Ib').

In the above example, the pow(a, b) function returns the value of a raised to the bth power. The log(a) function returns the logarithm to the base 10 of the value of a.

The method and apparatus of the present invention may also be used to simulates the dye-thinning aspects of bleach and water by accomplishing these operations in the dye density domain. By lowering the concentration of a dye, it may be thinned, and by increasing a dye's concentration, it may be thickened. Thus a thinning or thickening fraction (called "Tf") is used. Tf has a value less than 1.0 for thinning and greater than 1.0 for thickening.

To thin or thicken a dye color, the following is done:

(1) The color components (Ir, Ig, and Ib) are converted to densities (Ic, Im, and Iy):

transmittance_to_density(Ir, Ig, Ib, Ic, Im, Iy).

(2) The densities are reconcentrated by the thickening or thinning fraction:

$$Ic' = Tf*Ic,$$

$$Im' = Tf*Im,$$

$$Iy' = Tf*Iy.$$

(3) The new image densities (Ic', Im', and Iy') are converted back into the new image color components (Ir', Ig', and Ib') for the purpose of storing back into the image conveniently:

density_to_transmittance(Ic', Im', Iy', Ir', Ig', Ib').

In the above example, the pow(a, b) function returns the value of a raised to the bth power. The log (a) function returns the logarithm to the base 10 of the value of a.

To implement the above operations of overlaying dyes, removing dyes, mixing dyes, and thickening and thinning dyes efficiently, reference to a table may be used. Since the transmittance values are all represented in 8 bits, a simple 256-entry table can be used to convert the integer transmittance values to density values. Density values can be represented in integer format, making multiplication, addition, and subtraction much quicker and more portable. Converting back to transmittance values can be accomplished with a table lookup as well, if care is taken to allow for headroom in the calculations.

The format for the density values must include sufficient range to include a density of 3.0 (which is the maximum density representable in a color component converted from transmittance directly to density, as mentioned above) times 9.0 (which is the maximum allowed over-concentration factor plus one, as mentioned above) which is 27.0. Also, negative densities are sometimes encountered in the above operations, although they are not physically realistic. Therefore, an integer format consisting of a sign bit, five bits before the decimal point, and ten bits after the decimal point is chosen to represent density. This fits in a 16-bit computer word. In addition, the density result is scaled down by an integer factor of 3.0, which makes the maximum density an integer power of two and also decreases the required amount of headroom in the calculations, especially decreasing the size of the density to transmittance conversion table. Therefore, the C code fragment which takes an integer transmittance component value "T" (an unsigned 8-bit value) into an integer density component value "D" (a 16-bit value) is as follows:

```
unsigned char T;
short D;
double d;
if (T == 0)
        d = 3.0;
else
        d = -log10((double)T/255.0);
d = d * 1024.0/3.0;
D = (short)(d + 0.5);
```

In the above code fragment, the aforementioned variables T and D are declared, as well as a temporary double floating point value d. Note that the transmittance value of 0 is singled out to prevent an infinity from creeping into the calculations when the logarithm is taken. Its density is taken to be 3.0, as mentioned before. The log 10(a) function is taken to return the value of the logarithm to the base 10 of the value of a. Note that T is casted to double and scaled onto the range [1/255 . . . 1] before taking its logarithm to the base 10. Note that d is rounded before being casted to short before being stored into D.

The above calculation is preferably performed on all values from 0 through 255 and stored into a table which is indexed by the 8-bit unsigned integer transmittance value. Thus, a single transmittance component value can be quickly converted to the integer density component value by a single table lookup rather than by a series of complex computations. This speeds up the operations on dye components accordingly.

Given that the results of the dye overlay operation can achieve densities of 27.0, the table which converts from density back to transmittance need only have 9217 elements (equal to (9* 1024)+1). Therefore, to be certain that the integer density component indices are within range, 10,000 elements are computed. This table is indexed directly by the integer density component and contains the 8-bit integer transmittance value for each index. Using the same variables as the formula for the conversion from integer transmittance to integer density, the conversion may be expressed from integer density to integer transmittance as follows:

```
unsigned char T;
short D;
double d;
d = 255.0 * pow(10.0, - (double)D * 3.0/1024.0);
if (d < 0.0)
        d = 0.0;
if (d > 255.0)
        d = 255.0;
T = (unsigned char)(d + 0.5);
```

In the above code fragment, the aforementioned variables T and D are declared, as well as a temporary double floating point value d. Note that the integer density component value D is casted to double before scaling it into a value which corresponds to optical density. The optical density value is converted to transmittance by raising 10 to the power of the negative of the optical density. The transmittance is then scaled onto the range 0 through 255 inclusive to match the integer transmittance component definition. The integer transmittance component is then clipped onto the 8-bit range and rounded before being stored into the 8-bit value T (accomplished by a cast to the unsigned char data type). Note that the function pow(a, b) returns the value of a raised to the power of the value of b.

When rendering a pencil, charcoal, chalk, or oil brush stroke, the donor medium interacts with the grain of the receptor medium. Prior art addressed the problem of the irregular edges of a brush stroke by introducing simple randomness into each picture element of the brush stroke. This method applies a grain channel, which is taken from a rectangular 8-bit fill pattern to be described here, to the stroke. The donor's tip is modeled by an 8-bit function simulating the three-dimensional shape of the pencil, chalk, charcoal, or camel's hair brush. However, note that these tip shapes must change over time in order to achieve a passable simulation of brush shape. Furthermore, for a camel's hair brush, there must be multiple bristles in order to accurately simulate the look of a brush stroke.

In the present invention, the grain comes from a fill pattern. This pattern is a rectangular 8-bit unsigned map of values which signify the three-dimensional surface of the grain. We can assume for simplicity that the grain values range between 0 and 255 and connote the height values on the range 0.0 to 1.0 inclusively. The fill pattern is a rectangular array with toroidal topology: if you want a sample in a given pixel location X and Y, and the texture fill pattern has a shape of NR rows by NC columns, the fill pattern is preferably indexed as a two-dimensional array, as follows:

```
unsigned char value;
unsigned char grain_pattern[NR][NC];
short X, Y;
value = grain_pattern[Y % NR][X % NC].
```

The the 8-bit variable "value" is declared as an unsigned char (8-bit unsigned value). The "grain_pattern" array variable is declared to contain NR times NC unsigned char (8-bit) values. The indices into the array are "X" and "Y", both defined to be 16-bit index values. The C operator "%" connotes the standard modulus operation (mod in Pascal). It should be noted that this definition helps the paper grain to stay put on the page as well. Also note that since the paper grain comes from a fill pattern, it can be changed at any time without the work required to fill a mask or alpha channel with the grain. This new method is a significant advance over the prior art.

In the present invention, the donor tip combines with the paper grain in a new way. The donor tip is also represented by an 8-bit value between 0 and 255 inclusive. This novel method models the donor tip scale as different from the scale of the paper grain, which is consistent with natural media. In fact, the donor tip is usually much larger than the the scale of the paper grain. To accomplish this, the Z displacement (of the donor tip into the paper grain) is controlled by an external parameter such as donor tip pressure, donor tip velocity, donor tip direction, or combinations of the above. The maximum variance of the paper grain is also modified by the scaling variable, which is a function of the donor tip and the paper grain scales. A scaling value of ⅛th is a typical representative value which brings the variations in grain down to a minimum, affecting the edges of the stroke rather than simply varying the opacity of the stroke by the grain function. If P is the value from the donor's tip, and G is the value from the paper grain, and O1 is a general opacity function that is varied over the stroke which affects the penetration of the donor's tip into the paper grain, and S is the scale by which the donor's tip is larger in depth than the paper grain (for instance, 8.0), and O2 be a general opacity function that is varied over the stroke which affects the concentration or the density of the stroke (for overlaying dyes), then we can compute a mixing or overlay fraction F as follows (P, G, O, and F are assumed to be on the range 0.0 to 1.0 inclusive, for the purposes of simplicity):

```
double F, P, O1, S, G, O2;
F = P * O1 * S;
F = F - G;
if (F <= 0.0)
    return;
if (F > 1.0)
    F = 1.0;
F = F * O2;
```

All of the variables are preferably declared to be double floating point. An initial scale of the donor's tip depth is performed by multiplying it by the value "S". This is also where the first opacity variable "O1" is multiplied by the donor's tip for the purposes of varying the penetration into the grain over the stroke as a function of time. At this point, the paper grain element "G" is subtracted from this product (since it is an opposing height field). If the result is less than or equal to 0, then no transfer of color to the page is performed. This corresponds to the case where the donor's tip does not meet the page and thus makes no mark. If the result is greater than 1, the fraction reaches its maximum and saturates. This is accomplished by simple clipping code. This corresponds to the flaking of the donor medium onto the paper grain. In the case of chalk, charcoal, oils, and others there is a hard limit to the amount of dye or hiding power transferred to the page. The final statement in the above code multiplies the result by the second opacity variable "O2", which has the effect of adjusting the limit of maximum dye or donor medium transferred to the page over the stroke. The above code is used to control the color overlay and/or color mixing variable for each pixel of each brush dab which makes up the stroke and is flowcharted in FIG. 4. Other code, described in this disclosure is used to actually transfer or overlay the color to the image.

When rendering strokes from any natural media donor, it is necessary to vary the size and shape of the donor's tip is response to pressure, velocity, and direction along the stroke. Preferably this is accomplished by pre-computing many different brush tip images and choosing the proper brush tip image along the stroke. The present invention uses multiple brush sizes to facilitate in constructing a tapered brush stroke with the brush size varied continuously along the slope as a function of pressure, velocity, direction, or some combination of the above parameters.

To vary the brush size, for example, between a minimum size A and a maximum size B, it is important to compute intermediate sizes which vary in equal percentages of size. To do this, the instant invention employs a percentage of size change variable P. The intermediate brush sizes which are computed are evenly spaced on a chart which is displayed in the logarithm of the brush width.

```
short nsteps, i;
```

```
double A, B, P, e, WF, W;
e = log(B) - log(A);
nsteps = round(e / log(1.0 + P / 100.0));
WF = exp(e / (double)nsteps);
for (i = 0, W = A; i <= nsteps; i = i + 1, W = W * WF)
    {
        /* ... construct brush tip of width W ... */
    }
```

Preferably, the variables are declared as 16-bit integers and double floating point values. The difference in the logarithms of the minimum and maximum widths is computed. The number of steps is computed by dividing this value by the logarithm of the factor which is 1 plus the percentage of change. The percentage of change value "P" is divided by 100 before being added to 1.0 to form the optimal desired factor between successive widths. Since the actual number of steps must be an integer, it is rounded in this calculation. The width factor value "WF" is computed from this rounded value by dividing the difference in width logarithms by the number of steps. This spaces the result widths evenly in percentage size difference. Finally each brush is constructed by varying the width from A to B in multiplicative increments of WF. It should be noted that the log (a) function returns the value of the natural logarithm of the value of a; that the exp(a) function returns the value of e raised to the power of the value of a.; and, that the round(a) function returns the nearest integer value to the value of a, in the preferred system and method.

The brush size is preferably controlled by pressure so that harder pressures result in a larger brush width and a wider stroke and lighter pressures result in a smaller brush width and a thinner stroke. The brush size is also controlled by velocity in a manner such that slower strokes result in a larger brush width and a wider stroke and faster strokes result in a smaller brush width and a thinner stroke. Controlling the brush size based on the direction of the stroke results in strokes which vary their width as a function of stroke direction. It should be noted that the pressure, velocity, and direction parameters are all real time parameters which vary along the stroke. Various parameters can be used to change brush shape and size. These real time parameters are related to the tilt, bearing angle, and roll angle of the stylus and correspond to the position of the tip of the donor medium with respect to receptor medium orientation.

It is desirable to represent camel's hair brushes as multiple bristles in order to provide the maximum accuracy of rendering. These bristles' strokes are related with each other in direction, pressure, and velocity. A new method of generating these multiple strokes as a result of one brush stroke by a stylus 5 on tablet 4 as shown in FIG. 1, is explained here.

A single stroke is collected as a list of samples. Each sample may consist of a location in x and y, preferably measured to subpixel accuracy, as well as a pressure, a bearing angle, a tilt angle, and a roll angle.

Multiple copies of this stroke are generated, each with their own separate offset from the original stroke. These offsets are random offsets calculated in polar coordinates using a random bearing angle and a random length. The vectors are preferably scaled in proportion to the current width of the brush stroke at each sample.

While the present invention has been particularly described with reference to FIGS. 1-4, and with emphasis on the preferred embodiment of the invention, it should be understood that the figures and examples are for illustration only, and should not be construed as limitation upon the invention. In addition, it is clear the the method and apparatus of the present invention, has utility in any application where graphic representations on a CRT or other display device are desired. It is contemplated that many modifications may be made by one of ordinary skill in the art, without departing from the spirit and scope of the invention as disclosed above.

I claim:

1. A method for a placement of a donor color onto a receptor color, said donor and receptor colors being represented in a red-green-blue format, for producing marks, washes, strokes, colorations or effects similar to those produced with natural dyes, wherein said placement is produced in a two-dimensional image field on a computer, said image field comprising picture elements that can individually be used as said receptor colors, said method comprising the steps of:

modifying red, green, and blue receptor picture element components into cyan, magenta, and yellow density components comprising a three-element absorption spectrum, converting red, green, and blue donor picture element components into cyan, magenta, comprising a three-element absorption spectrum, scaling cyan, magenta, and yellow donor density components by a penetration fraction, said scaling corresponding to control over the amount of said donor color deposited, adding said donor density components into a receptor density component, transforming said cyan, magenta, and yellow receptor density components to red, green, and blue updated receptor transmittances, and depositing said updated red, green, and blue transmittances into said two-dimensional image field.

2. The method of claim 1 wherein said absorption spectrum is represented in a log density domain.

3. The method of claim 2 wherein said deposit of said updated red, green, and blue transmittances into said image field allows a change in said two-dimensional image field color as represented by said red, green and blue component values.

4. A system for varying a tip size of an implement having contact with a surface in response to a real-time-varying means, said real-time-varying means being under manual control, for producing strokes or marks of said implement which exhibit varying stroke or mark width, wherein said strokes or marks are produced in a two-dimensional image field on a computer, said system comprising the steps of:

computing a set of implement tip height field arrays which vary from a minimum desired implement tip width to a maximum desired tip width, said widths being spaced evenly and are represented as an array of two-dimensional height fields, each two-dimensional height field being a separate representation of an implement tip height fields of a given width and having individual horizontal and vertical subpixel offset, varying the desired width of said implement tip in response to said real-time-varying means under manual control, selecting an implement tip height field array whose width most nearly approximates said desired implement tip width, applying said implement tip height field array, and modifying spacing of contact marks so that said contact marks are spaced apart by a distance proportional to an average of the widths of said contact marks, so that strokes or marks made by said implement may exhibit varying widths.

5. The system of claim 4 wherein said implement tip height field arrays widths are spaced evenly in a logarithm of implement tip width.

6. The system of claim 4 wherein each of said implement tip height field arrays represents a single implement tip width.

7. The system of claim 4 wherein said real-time-varying means include one or more parameters comprising, velocity, direction, pressure, bearing angle, tilt angle, or roll angle of a locator device.

8. A method for sequencing and rendering marks of contact between an implement tip and a surface for producing strokes or marks of said implement onto said surface, said strokes or marks being continuous, smooth, and without visible artifacts, said strokes or marks being rendered for the purpose of simulating accurately the strokes or marks occuring in the use of natural media, wherein said strokes or marks are produced in a two-dimensional image field on a computer, said method comprising the following steps:

computing a two-dimensional array of two-dimensional height fields, said array of height fields representing renderings of the said implement tip, each said rendering representing a separate horizontal and vertical subpixel offset, the number of said renderings being a function of the width of said implement tip, evaluating a set of placement positions for the rendering of marks of contact, said positions being regularly spaced along said strokes, said spacing being calculated as a percentage of the current width of said implement tip, said positions being measured at subpixel accuracy, designating, for each of said placement positions, a height field from said two-dimensional array of height fields which corresponds most closely with said horizontal and vertical subpixel offsets of said placement position, subtracting, for each of said placement positions, said horizontal and vertical subpixel offsets from said placement position to yield an integer horizontal and vertical pixel offset within said two-dimensional image field, and overlaying, for each of said placement positions a corresponding designated height field at said integer horizontal and vertical pixel position, to render said marks of contact between said tip and said two-dimensional image field, said designated height fields being used as a plurality of donor tip deposit fractions.

9. A method for sequencing and accurately placing multiple marks of contact or strokes made by an implement tip onto a surface, for producing strokes or marks of contact similar to and accurately representing brushwork, wherein said strokes are produced in a two-dimensional image field on a computer, said method comprising the following steps:

collecting all input samples for a stroke of an implement tip in relation to a surface into a store, said samples comprising location in x and y, pressure, bearing angle, tilt, and roll of said implement tip, creating a family of strokes related to said stroke, the number of strokes in said family of strokes being typically on but not limited to the range 2 through 20 strokes, and displacing each of said strokes by a vector, said vector being formed by a polar coordinate with random bearing and random length.

10. The method of claim 9 wherein said vector is scaled as a function of said stroke width at each location in said stroke, said scaling function being a fraction of the current stroke width at each location.

* * * * *